US007025557B2

(12) United States Patent
Japikse et al.

(10) Patent No.: US 7,025,557 B2
(45) Date of Patent: Apr. 11, 2006

(54) SECONDARY FLOW CONTROL SYSTEM

(75) Inventors: David Japikse, Norwich, VT (US); Daniel O. Baun, White River Junction, VT (US)

(73) Assignee: Concepts ETI, Inc., White River Junction, VT (US)

( * ) Notice: Subject to any disclaimer, the term of this patent is extended or adjusted under 35 U.S.C. 154(b) by 121 days.

(21) Appl. No.: 10/757,334

(22) Filed: Jan. 14, 2004

(65) Prior Publication Data

US 2005/0152775 A1 Jul. 14, 2005

(51) Int. Cl.
*F04D 29/44* (2006.01)

(52) U.S. Cl. ......................... 415/1; 415/58.4; 415/145; 415/151; 415/914

(58) Field of Classification Search .................... 415/1, 415/58.4, 116, 144, 145, 149.1, 151, 910, 415/914
See application file for complete search history.

(56) References Cited

U.S. PATENT DOCUMENTS

| | | | | |
|---|---|---|---|---|
| 1,111,498 | A | 9/1914 | Rotter | |
| 2,342,219 | A | 2/1944 | Price | 230/114 |
| 2,398,619 | A | 4/1946 | Clark | 415/27 |
| 2,405,282 | A | 8/1946 | Birmann | 230/47 |
| 2,656,096 | A | 10/1953 | Schwartz | 230/116 |
| 2,658,338 | A | 11/1953 | Leduc | 60/39.36 |
| 2,698,711 | A | 1/1955 | Newcomb | 230/114 |
| 2,704,516 | A | 3/1955 | Mock et al. | 103/88 |
| 2,709,917 | A | 6/1955 | Bruynes | 73/147 |
| 2,786,420 | A | 3/1957 | Kenney | 103/97 |
| 2,832,292 | A | 4/1958 | Edwards | 103/87 |
| 2,837,270 | A | 6/1958 | Chapman | 230/115 |
| 2,865,297 | A | 12/1958 | Cliborn et al. | 103/103 |
| 2,874,642 | A | 2/1959 | Forrest | 103/97 |
| 2,966,028 | A | 12/1960 | Johnson et al. | 60/35.6 |
| 3,070,025 | A | 12/1962 | Cliborn | 103/97 |

(Continued)

FOREIGN PATENT DOCUMENTS

| | | |
|---|---|---|
| EP | 0399343 B1 | 4/1994 |

(Continued)

OTHER PUBLICATIONS

"Control of Backflow at the Inlets of Centrifugal Pumps and Inducers," by Donald P. Sloteman, Paul Cooper and Jules L. Dussourd, *Proceedings of the First International Pump Symposium*, Texas A&M University College Station, Texas, May 1984, pp. 9-22.

(Continued)

*Primary Examiner*—Edward K. Look
*Assistant Examiner*—Igor Kershteyn
(74) *Attorney, Agent, or Firm*—Downs Rachlin Martin PLLC

(57) ABSTRACT

The present invention is a system (20) for controlling various fluid flows, e.g., secondary fluid flows including cavitating fluid flows, typically developed along the shroud line and usually in or around a leading edge (21) within a flow channel (22) of a compressor or pump impeller (23) and inducer/impeller (24). System (20) includes a plurality of devices for controlling various flow conditions. In one embodiment, system (20) includes a diffuser device (27) for stabilizing cavitating flows, a bypass device (28) for re-injecting flow upstream, and a flow control device (30) for selectively directing secondary fluid flow to either the diffuser device or the bypass device. In addition, at very high flow rates, bypass device (28) may also serve as a high-flow, forward-bypass device. Devices (27) and (28) form a pathway for secondary fluid flows, including cavitating flows, around a first portion (31) of a housing (32).

38 Claims, 4 Drawing Sheets

U.S. PATENT DOCUMENTS

| | | | | |
|---|---|---|---|---|
| 3,090,321 | A | 5/1963 | Edwards | 103/113 |
| 3,106,165 | A | 10/1963 | Tyler | 103/97 |
| 3,123,285 | A | 3/1964 | Lee | 230/133 |
| 3,163,119 | A | 12/1964 | Huppert et al. | 103/89 |
| 3,217,655 | A | 11/1965 | Sercy et al. | 103/103 |
| 3,240,012 | A | 3/1966 | Price | 60/39.23 |
| 3,325,089 | A | 6/1967 | Vogler | 230/125 |
| 3,426,964 | A | 2/1969 | Silvern | 230/114 |
| 3,462,071 | A | 8/1969 | Garve | 230/114 |
| 3,484,039 | A | 12/1969 | Mittelstaedt | 230/122 |
| 3,504,986 | A | 4/1970 | Jackson | 415/11 |
| 3,730,639 | A | 5/1973 | Moore et al. | 415/119 |
| 3,741,677 | A | 6/1973 | Silvern et al. | 415/52 |
| 3,887,295 | A | 6/1975 | Yu | 415/116 |
| 3,893,787 | A | 7/1975 | Jones | 415/213 |
| 3,901,620 | A | 8/1975 | Boyce | 415/1 |
| 3,993,414 | A | 11/1976 | Meauze et al. | 415/181 |
| 4,063,848 | A | 12/1977 | Wiggins et al. | 415/206 |
| 4,097,186 | A | 6/1978 | Budris | 415/143 |
| 4,116,171 | A | 9/1978 | Schulmeister et al. | 123/41.57 |
| 4,142,839 | A | 3/1979 | Davis et al. | 417/89 |
| 4,212,585 | A | 7/1980 | Swarden et al. | 415/53 |
| 4,239,453 | A | 12/1980 | Hergt et al. | 415/182 |
| 4,248,566 | A | 2/1981 | Chapman et al. | 415/26 |
| 4,375,937 | A | 3/1983 | Cooper | 415/53 |
| 4,375,938 | A | 3/1983 | Dussourd | 415/53 |
| 4,642,023 | A | 2/1987 | Dunn | 415/53 |
| 4,673,331 | A | 6/1987 | Kolb | 415/53 |
| 4,678,405 | A | 7/1987 | Allen | 417/245 |
| 4,708,584 | A * | 11/1987 | Meng | 415/58.5 |
| 4,720,242 | A | 1/1988 | Lovisetto | 416/186 |
| 4,743,161 | A * | 5/1988 | Fisher et al. | 415/58.4 |
| 4,781,530 | A | 11/1988 | Lauterbach et al. | 415/170 |
| 4,815,935 | A | 3/1989 | Gottemoller | 415/211 |
| 4,834,611 | A | 5/1989 | Meng | 415/58.5 |
| 4,871,294 | A | 10/1989 | Ivanov et al. | 415/58.7 |
| 4,930,978 | A | 6/1990 | Khanna et al. | 415/58.3 |
| 4,981,018 | A | 1/1991 | Jones et al. | 60/726 |
| 4,990,053 | A * | 2/1991 | Rohne | 415/58.4 |
| 5,147,178 | A | 9/1992 | Treece | 415/58.4 |
| 5,186,601 | A | 2/1993 | Treece et al. | 415/58.4 |
| 5,286,162 | A | 2/1994 | Veres | 415/115 |
| 5,545,014 | A | 8/1996 | Sundberg et al. | 417/204 |
| 6,699,008 | B1 * | 3/2004 | Japikse | 415/58.4 |
| 2002/0192073 | A1 | 12/2002 | Japikse | |

FOREIGN PATENT DOCUMENTS

JP 09032722 A 2/1997

OTHER PUBLICATIONS

"Model 250-C30/C28B Compressor Development," by Dennis C. Chapman, General Motors Corporation, no date.

* cited by examiner

SECONDARY FLOW CONTROL SYSTEM

FIELD OF THE INVENTION

The present invention generally relates to the field of flow stabilization. In particular, the present invention is directed to a secondary flow control system.

BACKGROUND OF THE INVENTION

Pump and compressor designers use engineering principles to design a wide variety of pumps and compressors to meet industrial performance requirements. The design practice of the past century has been based principally on the assumptions of axisymmetric steady flow through turbomachines with most emphasis placed on the principal through-flow or primary passage flow. This historical design work has often encountered limitations due to stability problems as the flow is reduced and the head or pressure rises. Under this operation, the incidence on every vane element in the turbomachinery increases, levels of diffusion along critical surfaces rise substantially, and levels of secondary flow within passages increase.

Secondary fluid flows are elements of the overall flow field that have been subjected to force gradients across the main flow passage and result in vortices, skewed, i.e., three-dimensional, boundary layers, and so forth. Examples of secondary fluid flows are the well-known tip or part-span vortices, horseshoe vortices, passage vortices, backflow and recirculation flows, and other areas of flow which satisfy the laws of conservation of vorticity. These flows are much more difficult to work with and never contribute to improvement in performance of the stage. Yet, they cannot be avoided in a turbomachine, which always has cross-channel force gradients due to its fundamental nature, as reflected in the fundamental equations of motion covering these machines. All of these effects lead to the near certainty of stability problems of various types. Nearly all compressors experience a surge limit or boundary below which a machine cannot be operated without at least causing damage to the machine. Industrial practice uniformly rules out any operation below the surge line and even within a nominal percentage, i.e., typically five or ten percent, sometimes more, from this surge line. Designers have learned to respect this limit for compressors and an equivalent process for pumps. For pumps, surge usually does not occur as it does for compressors (due to lack of compliance in the system), but instabilities none-the-less occur which can destroy a pump or the entire system. An extreme example of pump instability is the Pogo effect. Many boiler feed pumps are limited by severe component stalling phenomena and there are resultant instabilities at part load.

It is desirable to have flexibility in shaping the head characteristic of a pump or a compressor. This may be accomplished by variable geometry elements such as variable inlet guide vanes, variable diffuser vanes, or equivalent devices. However, they are expensive, mechanically complex, and may reduce the operating time of the machine between maintenance intervals.

In addition to controlling secondary fluid flows, a further particular requirement for pumps is to provide the greatest possible suction capability before a particular breakdown phenomena known as cavitation occurs. Obviously, the first task for any pump or compressor is to create a low pressure at the inlet of the impeller so that fluid is drawn into the eye or inlet of that stage. Thus, it is well known that the lowest pressure point in a pump or compressor is usually very near the eye. Effects of blade blockage and incidence effects also cause local acceleration that can further drop the inlet static pressure. For the particular case of pumps, when this low inlet pressure drops below the vapor pressure of the liquid, bubbles are formed. These bubbles are referred to as cavitating flow. The bubbles are formed and then collapse later in the stage (unless there is too much cavitation that blocks the head rise characteristic of the impeller.) When the bubbles are collapsed, serious damage may occur and metal may be eroded away from the surface of even the toughest metallic vanes of a high-performance pump. This is a severe situation and one that must be designed for in all pump applications.

But the conditions may be even worse. In the process of setting up cavitation, certain instabilities occur from time to time. Critical aerospace applications and numerous industrial applications are limited in part, or in total, by the instability caused as cavitating flow switches into different locations in the downstream flow elements. This switching leads to an auto-oscillation that can cause enormous problems, such as the Pogo effect mentioned above. It is highly desirable to eliminate these instabilities. Additionally, the basic nature of the performance characteristic, as one approaches the breakdown point, must be dealt with. The conventional performance shows a progressive breakdown where the head is dropped as cavitation grows and blocks more and more of the passage with its vapor cavities. Indeed, even the standard design practice of remaining above 3% head breakdown does not eliminate the damage to the stage, but instead frequently assures that operation will occur in the region of greatest cavitation damage.

The prior art teaches or suggests the value of bleeding flow off at appropriate shroud line locations and either dumping the bleed overboard or reintroducing it somewhere upstream in order to improve flow capacity of a stage and to mitigate some of the effects spoken about above. However, most, if not all, prior art devices teach methods that are brutal to the flow and simply destroy or dissipate the energy that is bled off before the flow is allowed to be re-introduced.

SUMMARY OF THE INVENTION

One aspect of the present invention is a system for controlling secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, and the housing including an exit. The system includes one or more diffuser slots having first and second ends, each of the first ends configured to be in fluid communication with the flow channel, one or more diffuser passages each including first and second ends, each of the first ends in fluid communication with one of the second ends of the one or more diffuser slots, a plurality of re-entry passages, each including first and second ends, each of the first ends in fluid communication with the second end of the diffuser passage and each of the second ends configured to be in fluid communication with at least one of the inlet plenum, the housing exit, an area downstream of the housing exit, and the flow channel, and one or more bypass passages each having first and second ends, each of the first ends in fluid communication with the one or more diffuser slots and each of the second ends in fluid communication with at least one of the inlet plenum, the housing exit, an area downstream of the housing exit, and the flow channel.

Another aspect of the present invention is a system for controlling secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, the housing including an exit. The system includes the following: a radial diffuser device including at least one diffuser slot configured to be substantially perpendicular with respect to the axis, the at least one diffuser slot having first and second ends, the first end configured to be in fluid communication with the flow channel, and at least one diffuser passage in fluid communication with the at least one diffuser slot, each of the at least one diffuser passage including first and second diffuser passage ends, the first diffuser passage end in fluid communication with the second end of the at least one diffuser slot, the first and second diffuser passage ends having first and second cross-sectional areas, the second diffuser passage end cross-sectional area being greater than the first diffuser passage end cross-sectional area, a plurality of re-entry passages, each including first and second re-entry passage ends, each of the first re-entry passage ends in fluid communication with the second diffuser passage end and each of the second re-entry passage ends configured to be in fluid communication with at least one of the inlet plenum, the housing exit, an area downstream of the housing exit, and the flow channel; and a bypass device including a bypass passage having first and second bypass device ends, the first bypass device end in fluid communication with the at least one diffuser slot and the second bypass device end in fluid communication with at least one of the inlet plenum, the housing exit, an area downstream of the housing exit, and the flow channel.

Still another aspect of the present invention is an adjustable system for controlling a secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, the housing including an exit. The system includes a first mechanism for causing a two-phase fluid in the secondary fluid flow to collapse or condense into a substantially single-phase fluid, a second mechanism for causing the secondary fluid flow to flow upstream, and a third mechanism for directing the secondary fluid flow to said first means and said second means.

Yet another aspect of the present invention is a method of controlling secondary fluid flow within a flow channel. The method includes the following steps: a) providing a device for causing a two-phase fluid in the secondary fluid flow to collapse or condense into a substantially single-phase fluid; b) providing a passage that allows the secondary fluid flow to flow to a point upstream in the flow channel or a primary fluid flow to flow to a point downstream in the fluid channel; and c) directing the secondary fluid flow to either the device in step a) or device in step b).

Other features, utilities and advantages of various embodiments of the invention will be apparent from the following more particular description of embodiments of the invention as illustrated in the accompanying drawings.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1:
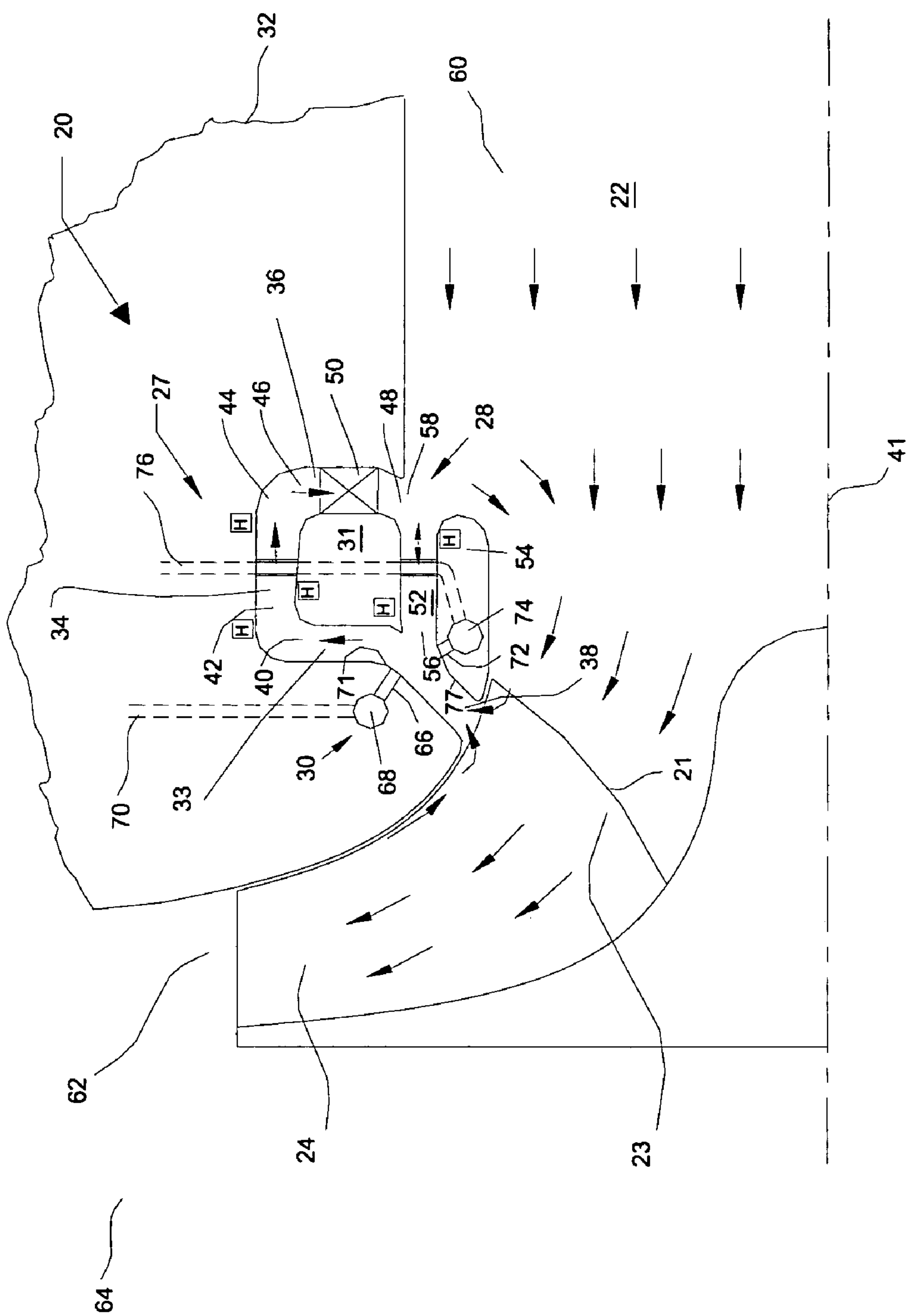
FIG. 1 is a schematic side section view of one embodiment of the present invention.

Referring now to the drawings in which like reference numerals indicate like parts, and in particular to FIG. 1, the present invention is a system 20 for controlling various fluid flows, e.g., secondary fluid flows including cavitating fluid flows, typically developed along the shroud line (not shown in FIG. 1) and usually in or around a leading edge 21 within a flow channel 22 of a compressor or pump impeller 23 and inducer/impeller 24. As explained further below, system 20 includes a plurality of devices for controlling various flow conditions. In one embodiment, system 20 includes a diffuser device 27 for stabilizing cavitating and other flows, a bypass device 28 for re-injecting flow upstream to reduce or increase the head-producing capability of impeller 23, and a flow control device 30 for selectively directing secondary fluid flow to either the diffuser device or the bypass device. In addition, at very high flow rates, bypass device 28 may also serve as a high-flow, forward-bypass device. Devices 27 and 28 form a pathway for both secondary fluid flows, including cavitating flows, i.e., see arrows for flow directions, around a first portion 31 of a housing 32. The term "channel" as used herein may mean any conduit for fluid flow having any cross-sectional shape. In addition, the term "housing" generally refers to the body of any type of equipment that may contain a fluid channel and the term "fluid" may refer to any gas including air, liquid, vapor, or any combination thereof, including dust laden gases and liquids. Finally, the term "compressor" may also refer to fans and blowers.

Referring again to FIG. 1, diffuser device 27 includes a diffuser slot 33, a diffuser passage 34, and a plurality of fluid re-entry passages 36, which form a pathway for diffusing fluid flows. Slot 33 includes a first end 38 for receiving fluid flows from flow channel 22 and a second end 40 through which at least partially diffused fluid flows exit. In one embodiment, slot 33 is a uniform annular slot. In other embodiments, slot 33 may include a plurality of ports or other openings, or a non-uniform annular slot, depending on the condition of the fluid flows to be controlled. The length of slot 33, i.e., the distance from first end 38 to second end 40, is selected depending on the desired level of diffusion. Generally, the longer the length of slot 33, the greater the drop in the velocity of the fluid flow, and the greater the diffusion of the fluid. Typically, the level of diffusion is controlled by selecting a particular radius ratio. The radius ratio is the distance from a centerline axis 41 of channel 22 to second end 40 divided by the distance from the axis to first end 38. In one embodiment, the radius ratio is greater than or equal to 1.03. Generally, the radius ratio is selected so as to provide sufficient diffusion to cause a two-phase fluid to collapse or condense into a substantially single-phase fluid. However, in some embodiments, the radius ratio is selected to optimize the overall performance of the fluid flow around first portion 31. While slot 33 in one embodiment extends substantially perpendicular relative to axis 41 of channel 22, the present invention encompasses divergence of up to about 65 degrees from a perfectly perpendicular relationship with the axis. Thus, the term "substantially perpendicular" encompasses such divergence from a perfectly perpendicular relationship. Slot 33 may have portions that are both perfectly perpendicular portions and portions that are angled with respect to axis 41. For example, in FIG. 1, the portion of slot 33 that begins at first end 38 and terminates adjacent first end 56 of bypass passage 52 is angled with respect to axis 41, while the portion of slot 33 that begins adjacent first end 56 and terminates at second end 40 is perfectly perpendicular with respect to axis 41. The degree of divergence from a perfectly perpendicular relationship for one or more portions of slot 33 that is encompassed by the present invention is influenced, as those skilled in the art will appreciate, by factors such as orientation of slot inlet flow velocity vector and diffuser/plenum space constraints.

Diffuser passage 34 includes a first end 42 for receiving the at least partially diffused fluid flow from slot 33 and a second end 44 through which the fluid flow exits. In one embodiment, the cross-sectional area of second end 44 is larger than the cross-sectional area of first end 42, thereby providing additional diffusion of the fluid flow as it flows through passage 34. In other embodiments, diffuser passage 34 may not be configured to provide additional diffusion of the fluids flowing therein.

Each of fluid re-entry passages 36 includes a first end 46 for receiving the at least partially diffused fluid flow from passage 34 and a second end 48 through which the fluid flow re-enters flow channel 22 at a point upstream from slot 33. Typically, fluid re-entry passages 36 are arranged in a uniform, annular formation around channel 22, with spacing between each of the passages. Also, as discussed further below and illustrated in FIG. 4, the spacing between each of fluid re-entry passages 36 may create a blank space 49 between each of the passages where no fluid is re-injected into channel 22. These areas allow a portion of the fluid in channel 22 to flow without disruption toward end 38 of slot 33. In addition, in at least one embodiment, the blank spaces between each of passages 36 are positioned so as to be in circumferential alignment with each first end 38 thereby further reducing disruption at each first end 38 by any fluids re-injected into channel 22. In one embodiment, each of fluid re-entry passages 36 has a circular cross-section. However, in alternative embodiments, fluid re-entry passages 36 may not be arranged uniformly or annularly around channel 22, e.g., only half of the channel may include re-entry passages. Also, in alternative embodiments, fluid re-entry passages 36 may have a square, rectangular, or other shaped cross-section. Depending on the desired flow condition, passages 36 may be directed substantially radially inwardly, i.e., toward channel 22 in substantially perpendicular relation to axis 41, to destroy any remaining swirl in the flow, or may be directed radially inwardly at other than substantially perpendicular relation to axis 41 to allow some swirl to remain before re-injection into the channel. Alternatively, some or all of re-entry passages 36 may include a flow conditioning structure 50, e.g., a small cascade of vanes, a swirl-producing volute, or a ring of drilled holes, all of which allow a prescribed angular momentum to be re-injected into the flow. In addition, the vanes used may be fixed or adjustable. Of course, some or all of fluid re-entry passages 36 may also be a simple parallel-wall structure that does not further influence the fluid flow.

Bypass device 28 includes a bypass passage 52 formed between first portion 31 and a second portion 54 of housing 32. Passage 52 includes a first end 56, which is in fluid communication with slot 33, and a second end 58, which is in fluid communication with at least one of channel 22, an inlet plenum 60, a housing exit 62, and an area 64 downstream of the housing exit. For convenience of illustration, second end 58 of passage 52 is shown in fluid communication with flow channel 22. As a bypass device, fluid flows through passage 52 from end 56 to end 58, i.e., upstream. However, as mentioned above, during high flow rates, device 28 serves as a high-flow, forward-bypass. As a high-flow, forward-bypass device, fluid flows through passage 52 from end 58 to end 56, i.e., downstream. In alternative embodiments, a plurality of bypass passages may be positioned along slot 33.

After fluid flow enters slot 33, it may be selectively directed to either diffuser passage 34 or bypass passage 52 by flow control device 30. In FIG. 1, flow control device 30 is a fluidic control element for applying a pressurized control fluid to the fluid flow to direct it in a particular direction. Flow control device 30 includes a first control slot or hole 66 that supplies the pressurized control fluid via a first plenum 68 and a first supply line 70 to direct the fluid flow toward passage 52. Slot or hole 66, plenum 68, and line 70 are formed in housing 32. Slot or hole 66 is formed in a sidewall 71 of slot 33 between first end 38 and first end 56. Flow control device 30 also includes a second control slot or hole 72 roughly opposite control slot or hole 66. Slot or hole 72 supplies the pressurized control fluid via a second plenum 74 and a second supply line 76 to direct the fluid flow toward passage 34. Slot or hole 72, plenum 74, and line 76 are also formed in housing 32. More specifically, slot or hole 72 and plenum 74 are formed in a sidewall 77 of housing portion 54. In alternative embodiments, flow control device 30 may be positioned elsewhere within slot 33.

Figure 2:
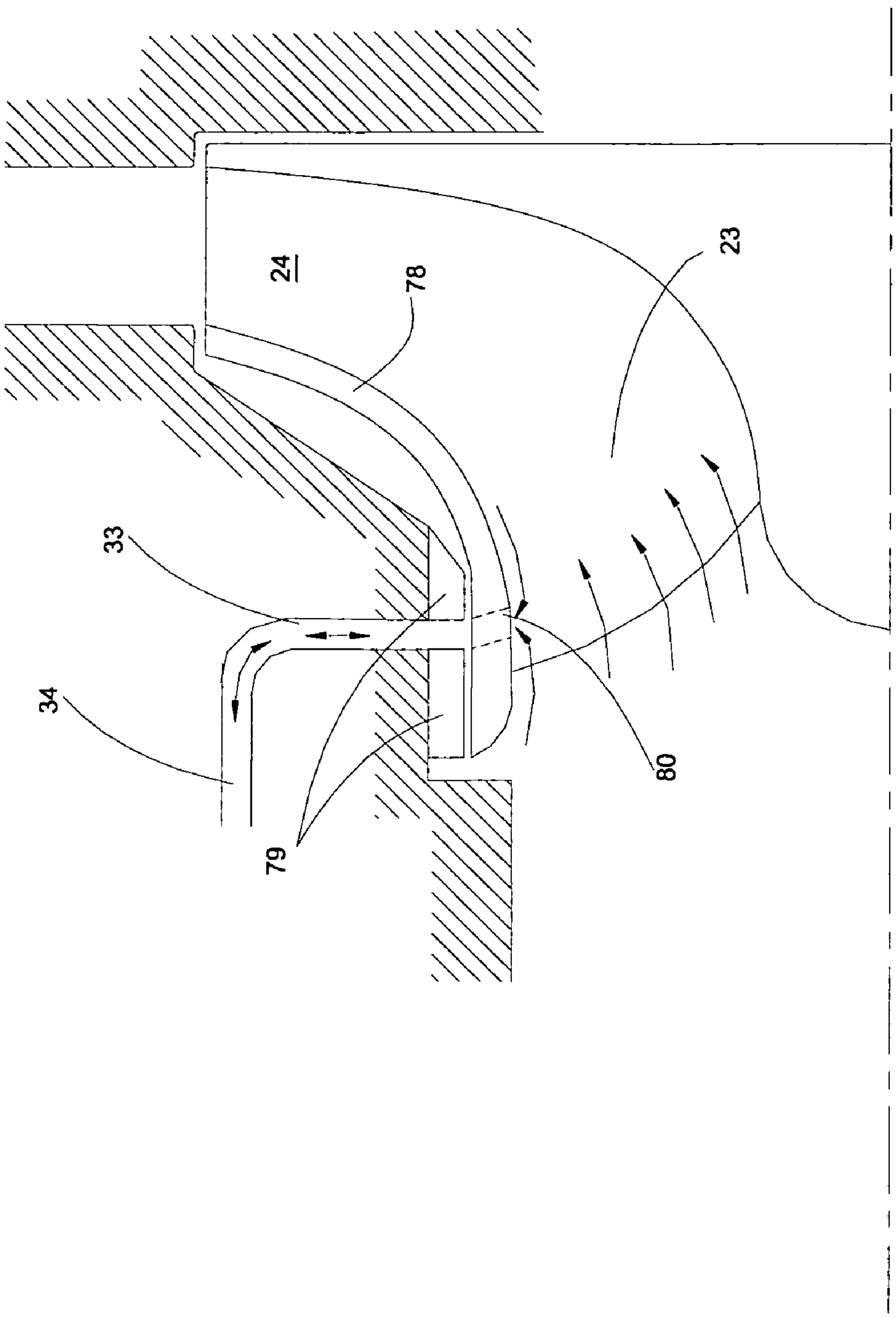
FIG. 2 is a schematic side section view of the embodiment in FIG. 1 with a shrouded inducer.

The pressurized control fluid may come from a region near the exit of inducer/impeller 24 where the pressures are highest, adjacent shroud 78 as illustrated in FIG. 2, adjacent leading edge 21 or up to 30% upstream or downstream from the leading edge, at the exit flange (not shown) from the compressor or pump stage, or from other areas where there is appropriate flow. In fact, by choosing different positions in the stage with different pressures, permanently connected control elements may be established to both plenums 68 and 74 so that a natural switching occurs as the pump or compressor moves from one flow or speed regime into another. Alternatively, a mechanical valve or a moving housing portion may be used instead of fluidic controls. For example, in one embodiment, portion 54 may be configured to move in a manner that directs flow into either passage 34 or passage 52. In another embodiment, a solenoid valve and shuttlecock are employed as part of device 30. In addition, in other embodiments, a plurality of fluid control devices may be used to direct fluid flows into a plurality of bypass passages, diffuser slots, or elsewhere.

In one embodiment of the present invention, one or more of portion 54, portion 31, and housing 32 may have heat transfer elements "H" to further control the secondary fluid flow. For example, condensate that is stripped off of a compressor flow path and passed through system 20 may be re-vaporized into a gaseous form by heating the fluid flow prior to re-injecting into channel 22. Conversely, if vapor bubbles are present in the fluid flow, either as cavitating pumpage or as dissolved gases which are outgassing, the bubbles may be further re-condensed by cooling the flow as it passes through system 20. Heat transfer elements H may include standard electrical heat coils, heat tape, heat exchangers, or similar.

Referring now to FIG. 2, the present invention may also be used with an impeller 23 or inducer/impeller 24 having a shroud 78 and annular seal 79 configuration, or similar. Flow is directed into slot 33 via an opening 80 in shroud 78. Annular seal 79 prevents fluid leakage as the fluid flows through opening 80 into slot 33. With exception to shroud 78, the remaining elements are as illustrated in FIG. 1.

In operation, the fluid flow, e.g., a secondary fluid flow including a cavitating fluid flow, is bled off flow channel 22 into first end 38 of diffuser slot 33. The flow proceeds radially outward through slot 33 and then horizontally forward, i.e., upstream, through diffuser passage 34. As the flow passes through slot 33 and passage 34, both radial and angular momentum are substantially conserved, thereby converting the high-kinetic energy into a static-pressure rise with a substantial reduction in velocity levels. In the case of pumps with the possibility of two-phase flow, slot 33 and passage 34 are typically configured so that the rise in static pressure is sufficient to collapse the bubbles and return the flow to a single-phase state. Diffuser passage 34 transports the flow to a more convenient location, i.e., typically upstream. The fluid flow exits diffuser passage 34 and enters a plurality of re-entry passages 36 before being re-injected into flow channel 22.

Instead of flowing through diffuser passage 34, the fluid flow may instead flow through bypass passage 52. The fluid flow that is bled off flow channel 22 first enters first end 38 of diffuser slot 33. However, instead of flowing into and through diffuser passage 34, the flow proceeds horizontally, i.e., upstream, through bypass passage 52. The fluid flow may be directed to flow through bypass passage 52 in instances where it may be desirable to retain some of the fluid's kinetic energy for other use, e.g., re-injection into flow channel 22 to change the head-producing capability of impeller 24. Optionally, passage 52 could have a cascade of vanes to produce more or less swirl within the passage. This could increase or decrease, depending on the direction of re-injection, the head producing capability of impeller 24. The cascade of vanes would also allow the tailoring of characteristics of the machine to particular application needs.

Whether the fluid flow enters diffuser passage 34 or bypass passage 52 depends upon flow control device 30 or on naturally arising force balances. As mentioned above, in one embodiment, flow control device 30 includes a fluidic control element. By applying a pressure through either control slot or hole 66 or 72 via plenum 68 and 74 and supply lines 70 and 76, respectively, it is possible to deflect the fluid flow in diffuser slot by a method known as fluidic control. Depending on whether pressurized control fluid is introduced through slot or hole 66 or slot or hole 72, the fluid flow may be directed to either bypass passage 52 or diffuser passage 34, respectively.

A further mode of operation is also possible. At very high flow rates, the static pressure at first end 38, i.e., inlet, of diffuser slot 33 is low. This occurs in pumps and compressors due to the large amount of flow that is introduced at the eye (not shown) of impeller 24. As a result, the conditions at very high flow rates are well above the normal design or best efficiency condition, and therefore considerable acceleration is caused at first end 38 with the consequence of a low static pressure. Under this circumstance, flow does not move into diffuser slot 33 and toward diffuser passage 34 or bypass passage 52, but rather fluid may be drawn from diffuser slot 33 into first end 38. Consequently, additional upstream flow may pass through bypass passage 52, down diffuser slot 33, and be re-injected into flow channel 22 in order to increase the flow capability of the stage. In this way, bypass passage 52 serves as a high-flow, forward-bypass passage with fluid flow moving from downstream through the passage.

Figure 3:
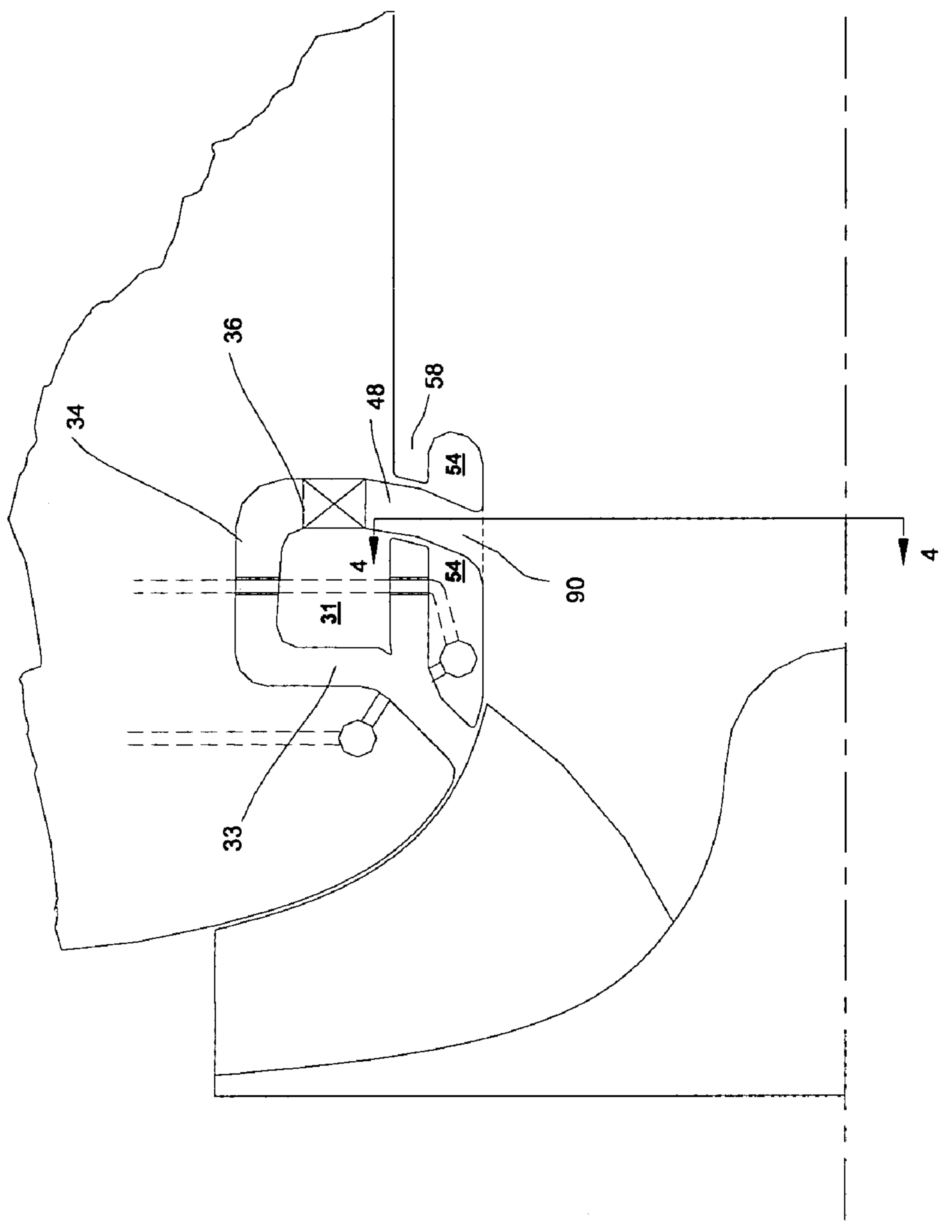
FIG. 3 is a schematic side section view of one embodiment of the present invention.
Figure 4:
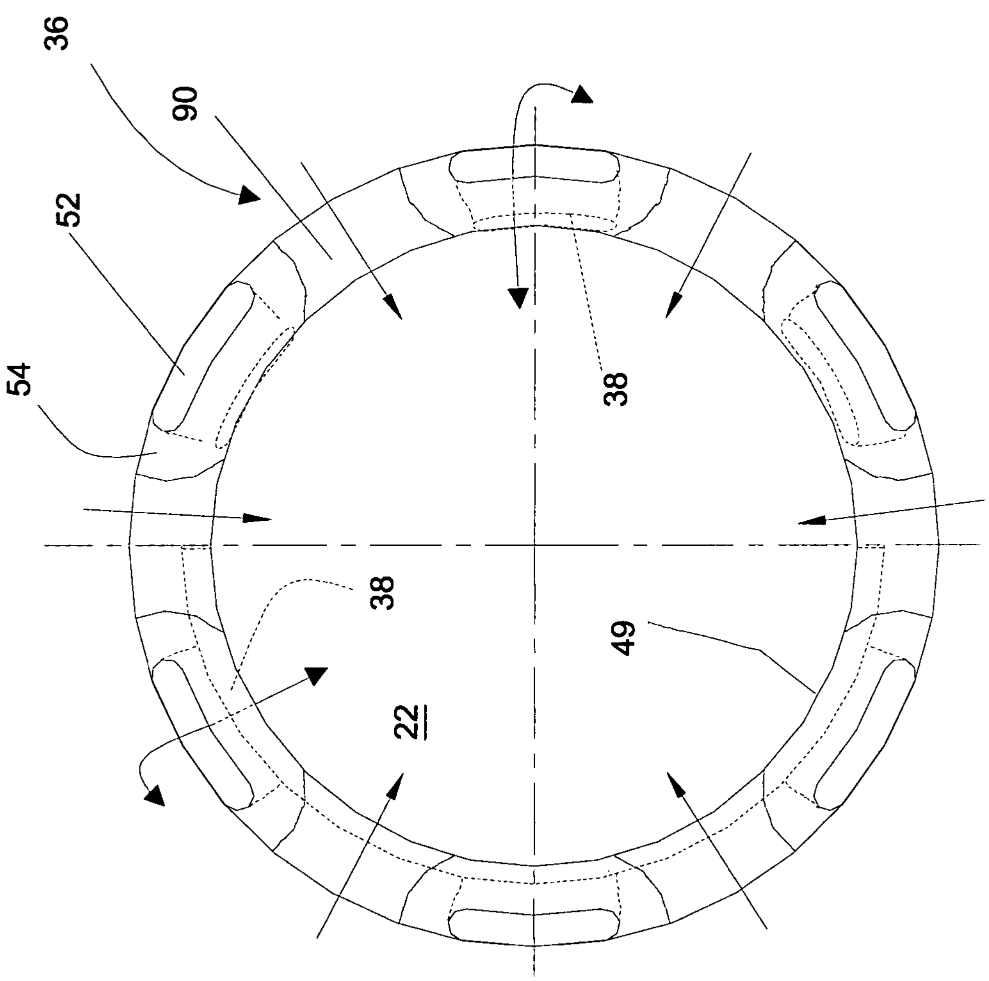
FIG. 4 is an enlarged view of the embodiment of FIG. 3 taken along line 4—4 in FIG. 3.

Referring now to FIGS. 3 and 4, in another embodiment of the present invention, each second end 48 of fluid re-entry passages 36 may be positioned downstream from second end 58 of bypass passage 52. Depending on the characteristics of the fluid flow, in some instances it may be desirable to re-inject the flow into channel 22 at a position closer to leading edge 21 of impeller 24. Using precision casting options, e.g., investment casting, or other known methods such as forming with a hole and a press-in ring, fluid re-entry passages 36 and passage 52 may be formed in housing 32 so that they crossover one another. Each of re-entry passages 36 are fluidly connected to a return flow channel 90 that crosses through portion 54. Each of return flow channels 90 joins end 48 of a respective passage 36 with channel 22.

As best illustrated in FIG. 4, to avoid mixing of fluids at second end 38 and to allow upstream fluid from 58 to continue downstream without interference from the flow being re-injected through each of return flow channels 90, the return flow channels are offset from bypass passages 52. In the embodiment illustrated in FIG. 4, the left half of channel 22, i.e., clockwise from six o'clock to 12 o'clock, includes a semi-annular slot 38 and the right half of the channel, i.e., clockwise from 12 o'clock to six o'clock, includes a plurality of non-annular slots 38. Of course in other embodiments, any combination of semi-annular and non-annular slots 38 may be used. For example, in one embodiment, slot 38 may be a fully annular slot. In another embodiment, slot 38 may be a plurality of non-annular slots. In addition, in at least one embodiment, each of return flow channels 90 are positioned so as to not be in circumferential alignment with each first end 38 thereby reducing disruption at each first end 38 by any fluids re-injected into channel 22 through the channels. Also, as mentioned above, the spacing between each of fluid re-entry passages 36 and return flow channels 90 typically creates a blank space 49 between each of the passages and channels where no fluid is re-injected into channel 22, e.g., each of the passages define individual fingers of flow with spacing between each finger. This further prevents the re-injected flow from interfering with portions of the flow in channel 22 and at first end 38.

The system of the present invention allows a designer to remove flow whose process has been compromised either by secondary fluid forces, cavitating fluid flows, or droplet accumulations. The flow then is removed from the flow path so that the rest of the passage can be designed according to conventional and historical norms and reach the highest possible level of performance downstream. In this system, a large number of unwanted compromises are completely eliminated or substantially controlled. These include cavitation, auto-oscillation, drooping head characteristics, inadequate surge line location, and inappropriate head characteristic slope. These have been achieved while permitting further improvements on the high flow end by allowing the same system to be used for high-flow bypass.

In one embodiment of the present invention, a system for designing flow control into a stage while not increasing cost or complexity or reducing durability is provided. A system according to the present invention helps eliminate, mitigate, or properly control instabilities such as auto-oscillation or cavitation up until the 3% head breakdown point.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A system for controlling secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, the housing including an exit, said system comprising:

one or more diffuser slots having first and second ends, each of said first ends configured to be in fluid communication with the flow channel;

one or more diffuser passages each including first and second ends, each of said first ends in fluid communication with one of said second ends of said one or more diffuser slots;

a plurality of re-entry passages, each including first and second ends, each of said first ends in fluid communication with said second end of said one or more diffuser passages and each of said second ends configured to be in fluid communication with at least one of the inlet plenum, the housing exit, an area downstream of the housing exit, and the flow channel; and one or more bypass passages each having first and second ends, each of said first ends in fluid communication with said one or more diffuser slots and each of said second ends in fluid communication with at least one of the inlet plenum, the housing exit, an area downstream of the housing exit, and the flow channel.

2. A system according to claim 1, further comprising at least one flow control device including one or more control elements for directing the secondary fluid flow in said one or more diffuser slots to said one or more diffuser passages or said one or more bypass passages.

3. A system according to claim 1, wherein said one or more diffuser slots are configured to be substantially perpendicular with respect to the axis.

4. A system according to claim 1, wherein said one or more diffuser slots are configured to be no more than 65 degrees from perpendicular with respect to the axis.

5. A system according to claim 1, wherein each of said first and second ends of said one or more diffuser passages has, respectively, first and second cross-sectional areas, said second cross-sectional area being greater than said first cross-sectional area.

6. A system according to claim 2, wherein said one or more control elements are fluidic control elements each having a slot joined with a plenum and a supply line for supplying a pressurized control fluid to said plenum.

7. A system according to claim 1, wherein said plurality of re-entry passages include flow conditioning structures.

8. A system according to claim 2, wherein said one or more control elements include mechanical control elements.

9. A system according to claim 2, wherein said one or more control elements include means for directing the secondary fluid flow in said one or more diffuser slots to one of said one or more diffuser passages or said one or more bypass passages.

10. A system according to claim 1, wherein said one or more diffuser slots has a radius ratio greater than or equal to 1.03 and said radius ratio is selected so that the system causes two-phase fluids to collapse or condense into a substantially single-phase fluid.

11. A system according to claim 1, wherein said plurality of re-entry passages are free of vanes.

12. A system according to claim 1, wherein said each of said one or more diffuser slots is a uniform annular slot.

13. A system according to claim 1, wherein said second end of each of said plurality of re-entry passages is positioned downstream from said second end of said one or more bypass passages.

14. A system according to claim 1, wherein the system further comprises means for heating or cooling secondary fluid flows.

15. A system according to claim 1, wherein the system further comprises a shroud and eye seal adapted to cover the impeller.

16. A system according to claim 1, wherein each of said second ends of said plurality of re-entry passages are positioned so as to define a blank space between each of said passages where no flow enters the flow channel.

17. A system according to claim 1, wherein each of said first ends of said one or more diffuser slots are circumferentially offset from each of said second ends of said plurality of re-entry passages.

18. A system for controlling secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, the housing including an exit, said system comprising:

a) a radial diffuser device including at least one diffuser slot configured to be substantially perpendicular with respect to the axis, said at least one diffuser slot having first and second ends, said first end configured to be in fluid communication with the flow channel, and at least one diffuser passage in fluid communication with said at least one diffuser slot each of said at least one diffuser passage including first and second diffuser passage ends, said first diffuser passage end in fluid communication with said second end of said at least one diffuser slot, said first and second diffuser passage ends having first and second cross-sectional areas, said second diffuser passage end cross-sectional area being greater than said first diffuser passage end cross-sectional area, a plurality of re-entry passages, each including first and second re-entry passage ends, each of said first re-entry passage ends in fluid communication with said second diffuser passage end and each of said second re-entry passage ends configured to be in fluid communication with at least one of the inlet plenum, the housing exit, an area downstream of the housing exit, and the flow channel; and b) a bypass device including a bypass passage having first and second bypass device ends, said first bypass device end in fluid communication with said at least one diffuser slot and said second bypass device end in fluid communication with at least one of the inlet plenum, the housing exit, an area downstream of the housing exit, and the flow channel.

19. A system according to claim 18, further comprising at least one flow control device including one or more control elements for directing the secondary fluid flow in said at least one diffuser slot to one of said diffuser passage or said bypass passage.

20. A system according to claim 18, wherein the housing has a movable portion, further wherein said bypass passage is partially defined by the movable portion.

21. A system according to claim 19, wherein said one or more control elements are fluidic control elements each having a slot joined with a plenum and a supply line.

22. A system according to claim 18, wherein said re-entry passages include flow conditioning structures.

23. A system according to claim 19, wherein said one or more control elements include mechanical control elements.

24. A system according to claim 19, wherein said one or more control elements include means for directing the secondary fluid flow in said at least one diffuser slot to one of said at least one diffuser passage or said bypass passage.

25. A system according to claim 18, wherein said at least one diffuser slot has a radius ratio greater than or equal to 1.03 and said radius ratio is selected so that the system causes two-phase fluids to collapse or condense into a substantially single-phase fluid.

26. A system according to claim 18, wherein said plurality of re-entry passages are free of vanes.

27. A system according to claim 18, wherein said at least one diffuser slot is a uniform annular slot.

28. A system according to claim 18, wherein said second end of said plurality of re-entry passages is positioned downstream from said second end of said bypass passage.

29. A system according to claim 18, wherein the system further comprises means for heating or cooling secondary fluid flows.

30. A system according to claim 18, wherein the system further comprises a shroud and eye seal adapted to cover the impeller.

31. A system according to claim 18, wherein each of said second ends of said plurality of re-entry passages are positioned so as to define a blank space between each of said passages where no flow enters the flow channel.

32. A system according to claim 18, wherein each of said first ends of said one or more diffuser slots are circumferentially offset from each of said second ends of said plurality of re-entry passages.

33. An adjustable system for controlling a secondary fluid flow within a flow channel, the flow channel having an inducer or impeller residing at least partially therein, the inducer or impeller having rotatable blades for drawing the flow into, or being driven by the flow in, the flow channel, the inducer or impeller rotatable about an axis, the flow channel defined by interior sidewalls of a housing, the housing at least partially surrounded by an inlet plenum, the housing including an exit, said system comprising:

a) first means for causing a two-phase fluid in the secondary fluid flow to collapse or condense into a substantially single-phase fluid, b) second means for causing the secondary fluid flow to flow upstream and c) third means for directing the secondary fluid flow to said first means and said second means.

34. An adjustable system according to claim 33, wherein said first means for causing includes a radial diffuser device including a diffuser slot configured to be substantially radial with respect to the axis, said diffuser slot having first and second ends, said first end configured to be in fluid communication with the flow channel, a diffuser passage, said diffuser passage including first and second diffuser passage ends, said first diffuser passage end in fluid communication with said second diffuser slot end, said first and second diffuser passage ends having first and second cross-sectional areas, said second diffuser passage end cross-sectional area being at least equal to said first diffuser passage end cross-sectional area, a plurality of re-entry passages, each including first and second re-entry passage ends, each of said first re-entry passage ends in fluid communication with said second diffuser passage end and each of said second re-entry passage ends configured to be in fluid communication with at least one of the inlet plenum, the housing exit, an area downstream of the housing exit, and the flow channel.

35. An adjustable system according to claim 34, wherein said second means includes a bypass device including a bypass passage having first and second ends, said first end in fluid communication with said diffuser slot and said second end in fluid communication with at least one of the inlet plenum, the housing exit, an area downstream of the housing exit, and the flow channel.

36. An adjustable system according to claim 35, wherein said third means is at least one flow control device, said at least one flow control device including one or more control elements for directing the secondary fluid flow in said diffuser slot to one of said diffuser passage or said bypass passage.

37. A system according to claim 34, wherein each of said second ends of said plurality of re-entry passages are positioned so as to define a blank space between each of said passages where no flow enters the flow channel.

38. A method of controlling secondary fluid flow within a flow channel, said method comprising the steps of:

a) providing a device for causing a two-phase fluid in the secondary fluid flow to collapse or condense into a substantially single-phase fluid;

b) providing a passage that allows the secondary fluid flow to flow to a point upstream in the flow channel and a primary fluid flow to flow to a point downstream in the fluid channel; and c) directing the secondary fluid flow to said device in step a) and said passage in step b).

* * * * *